(12) United States Patent
Lee (10) Patent No.: US 10,879,833 B2
(45) Date of Patent: Dec. 29, 2020

(54) BLOWER REGISTER

(71) Applicant: Hanon Systems, Daejeon (KR)

(72) Inventor: Jeong Yeop Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 370 days.

(21) Appl. No.: 15/928,313

(22) Filed: Mar. 22, 2018

(65) Prior Publication Data
US 2019/0115864 A1  Apr. 18, 2019

(30) Foreign Application Priority Data

Oct. 17, 2017 (KR) .................. 10-2017-0134582
Jan. 5, 2018 (KR) .................. 10-2018-0001949

(51) Int. Cl.
*H02P 29/40* (2016.01)
*F04D 17/16* (2006.01)
*F04D 27/00* (2006.01)
*B60H 1/00* (2006.01)
*F04D 25/08* (2006.01)

(52) U.S. Cl.
CPC ............. *H02P 29/40* (2016.02); *F04D 17/16* (2013.01); *F04D 27/004* (2013.01); *B60H 1/00828* (2013.01); *F04D 25/08* (2013.01)

(58) Field of Classification Search
CPC .... B23K 37/003; B23K 9/0953; B23K 9/121; B23K 9/1675; G11B 11/10576
See application file for complete search history.

(56) References Cited

U.S. PATENT DOCUMENTS

| | | | | |
|---|---|---|---|---|
| 5,566,143 A | * | 10/1996 | Minami | G11B 7/0941 369/44.11 |
| 6,812,658 B2 | * | 11/2004 | Vogt | F01P 7/048 318/400.26 |
| 2008/0190900 A1 | * | 8/2008 | Zhang | B23K 9/1675 219/121.45 |

* cited by examiner

*Primary Examiner* — Zoheb S Imtiaz
(74) *Attorney, Agent, or Firm* — Norton Rose Fulbright US LLP; James R. Crawford (57) ABSTRACT

A blower register includes a movable terminal, a plurality of fixed terminals to which the movable terminal is selectively connected, a plurality of resistors installed on the downstream side of the fixed terminals to adjust a current value of an electric current applied to a blower, and a current flow control part configured to subdivide the current value of the electric current in a number larger than the number of the fixed terminals and to form current flow paths through the resistors so that a rotation speed level of the blower is controlled to one of rotation speed levels larger in number than the fixed terminals.

9 Claims, 12 Drawing Sheets

BLOWER REGISTER

CROSS-REFERENCE TO RELATED PATENT APPLICATIONS

This application claims the benefit of each of Korean Patent Application No. 10-2017-0134582 dated Oct. 17, 2017 and Korean Patent Application No. 10-2018-0001949 dated Jan. 5, 2018. The disclosures of the above patent applications are hereby incorporated herein by reference in their entirety.

TECHNICAL FIELD

The present invention relates to a blower register and, more particularly, to a blower register that can increase the rotation speed level of a blower without a lot of design changes and structural changes and without a large increase in cost, thereby making it possible to expect a cost saving effect.

BACKGROUND ART

Figure 1:
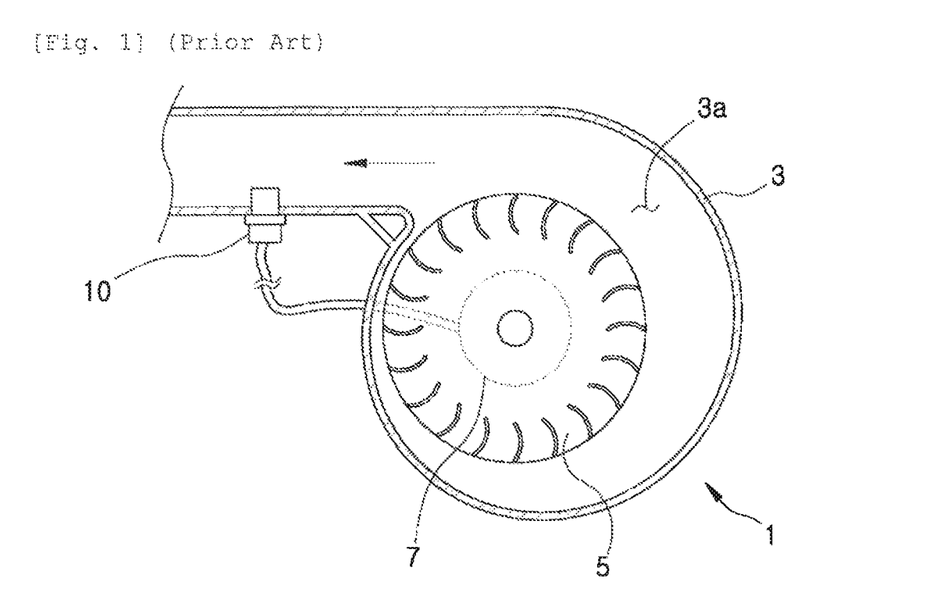
FIG. 1 is a view showing a conventional blower register.

A motor vehicle includes an air conditioner for cooling and heating the inside of the motor vehicle. As shown in FIG. 1, such an air conditioner includes a blower 1 for introducing an indoor air or an outdoor air and blowing the air into a passenger compartment.

The blower 1 includes a scroll casing 3, a blower fan 5 installed in an air blowing chamber 3a of the scroll casing 3, and a blower motor 5 for rotating the blower fan 5.

The blower motor 7 rotates the blower fan 5 while being operated depending on the applied electric power. This enables the blower fan 5 to introduce air existing inside or outside the passenger compartment and to blow the introduced air into the passenger compartment.

Meanwhile, the rotation speed of the blower motor 7 is controlled by a register 10. The blower motor 7 whose rotation speed is controlled adjusts the rotation speed level of the blower fan 5.

Figure 2:
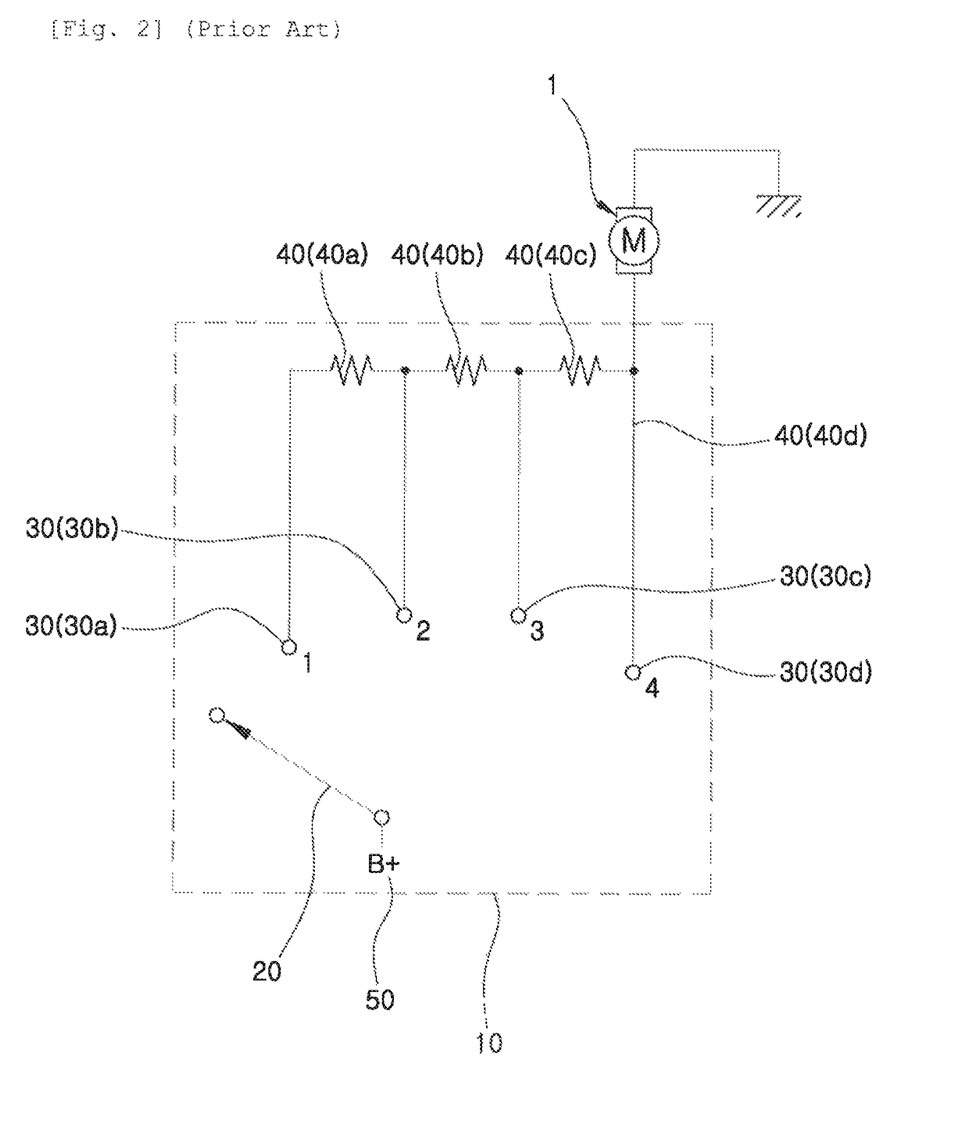
FIG. 2 is a circuit diagram showing a circuit of the conventional blower register.

As shown in FIG. 2, the register 10 includes a movable terminal 20, a plurality of fixed terminals 30 selectively connected to the movable terminal 20, and a plurality of resistors 40 installed on the downstream side of the respective fixed terminals 30.

The fixed terminals 30, which correspond to the respective rotation speed levels of the blower 1, are selectively turned on while being connected to the movable terminal 20. The fixed terminal 30 thus turned on applies the electric current of a battery 50 to the corresponding resistor 40 disposed on the downstream side thereof. The present invention will be described based on an example in which the blower has four rotation speed levels. Thus, four fixed terminal 30 are provided in a corresponding relationship with the four rotation speed levels of the blower. Hereinafter, the respective fixed terminals 30 will be referred to as "first to fourth fixed terminals 30a, 30b, 30c and 30d".

The resistors 40 (hereinafter referred to as "first to fourth resistors 40a, 40b, 40c and 40d") correspond to the respective rotation speed levels of the blower 1. The first to third resistors 40a, 40b and 40c are connected in series to the blower 1, and the fourth resistor 40d corresponding to the maximum rotation speed level of the blower 1 is directly connected to the blower 1.

The first to third resistors 40a, 40b and 40c are connected in series to the blower 1 in a state in which the first to third resistors 40a, 40b and 40c are provided on the downstream side of the first to third fixed terminals 30a, 30b and 30c.

When the movable terminal 20 is connected to any one of the first to third fixed terminals 30a, 30b and 30c, the first to third resistors 40a, 40b and 40c existing on the downstream side of the connected fixed terminal are connected in series to the blower 1.

For example, when the movable terminal 20 is connected to the first fixed terminal 30a, the first to third resistors 40a, 40b and 40c on the downstream side of the connected first fixed terminal 30a are connected in series to the blower 1. When the movable terminal 20 is connected to the second fixed terminal 30b, the second and third resistors 40b and 40c on the downstream side of the connected second fixed terminal 30b are connected in series to the blower 1. When the movable terminal 20 is connected to the third fixed terminal 30c, only the third resistor 40c on the downstream side of the connected third fixed terminal 30c is connected to the blower 1.

Accordingly, when the movable terminal 20 is connected to any one of the first to third fixed terminals 30a, 30b and 30c in order to adjust the rotation speed level of the blower 1 to any one of the first to third levels, the electric current of the battery 50 sequentially passes through the resistors 40a, 40b and 40c existing on the downstream side of the battery 50, whereby the current value is adjusted to adjust the rotation speed level of the blower 1.

As a result, when adjusting the rotation speed level of the blower 1 to any one of the first to third levels through the movable terminal 20 and the first to third fixed terminals 30a, 30b and 30c, the number of the resistors 40 through which the electric current of the battery 50 passes is varied depending on the rotation speed level of the blower 1, whereby the current value of the battery 50 applied to the blower 1 is adjusted to adjust the rotation speed level of the blower 1.

The fourth resistor 40d has a lower resistance value than the first to third resistors 40a, 40b and 40c. Thus, when the movable terminal 20 is connected to the fourth fixed terminal 30d in order to adjust the rotation speed level of the blower 1 to the fourth level, the fourth resistor 40d existing one the downstream side of the fourth fixed terminal 30d applies a higher current to the blower 1 than the first to third resistors 40a, 40b and 40c. This enables the blower 1 to operate at the highest rotation speed level.

However, in the conventional register 10 described above, when one attempts to increase the rotation speed levels of the blower 1, for example, from a fourth level to an eighth level, it is necessary to add the fixed terminals 30 and the resistors 40 in conformity with the increased rotation speed levels. Thus, the register 10 has to be redesigned.

Due to such a disadvantage, when increasing the rotation speed level of the blower 1, a large number of parts are consumed and the circuit structure becomes complicated, which is very disadvantageous in terms of cost and time. This leads to an increase in manufacturing cost.

Under the circumstances, there has been proposed a technique in which a field effect transistor (FET) is provided on a circuit of register to variably control the applied current of a blower so that the rotation speed levels of the blower can be increased.

However, this technique is still disadvantageous in that a lot of cost is required due to the use of an expensive field effect transistor.

SUMMARY OF THE INVENTION

In view of the aforementioned problems inherent in the related art, it is an object of the present invention to provide a blower register capable of increasing the number of rotation speed levels of a blower without additionally installing fixed terminals and resistors, making many structural changes and increasing costs.

Another object of the present invention is to provide a blower register capable of increasing the number of rotation speed levels of a blower with little burden of cost and expecting a cost saving effect.

According to one aspect of the present invention, there is provided a blower register, including: a movable terminal; a plurality of fixed terminals to which the movable terminal is selectively connected; a plurality of resistors installed on the downstream side of the fixed terminals to adjust a current value of an electric current applied to a blower; and a current flow control part configured to subdivide the current value of the electric current in a number larger than the number of the fixed terminals and to form current flow paths through the resistors so that a rotation speed level of the blower is controlled to one of rotation speed levels larger in number than the fixed terminals.

In the blower register, two or more of the resistors may be connected in series to the blower so as to adjust the current value of the electric current applied to the blower while allowing the electric current supplied to one of the fixed terminals to sequentially pass through the resistors, and the current flow control part may be configured to, when the electric current is supplied to one of the fixed terminals, control a flow of the electric current so that the electric current bypasses one or more of the resistors existing on the downstream side of one of the fixed terminals to which the electric current is supplied, whereby the current flow control part variably controls the number of the resistors through which the electric current passes, and subdivides the current value of the electric current applied to the blower.

In the blower register, one of the fixed terminals may be directly connected to the blower, and the current flow control part may include one or more bypass switches configured to control a flow of the electric current so that the electric-current bypasses one or more of the resistors existing on the downstream side of one of the fixed terminals to which the electric current is supplied, and configured to variably control the number of the resistors through which the electric current passes.

According to another aspect of the present invention, there is provided a blower register, including: a movable terminal; a plurality of fixed terminals to which the movable terminal is selectively connected; a plurality of resistors installed on the downstream side of the fixed terminals to adjust a current value of an electric current applied to a blower; and a control part configured to calculate the number of oases of total current flow paths with respect to the resistors using a pre-stored equation wherein, based on the number of cases of total current flow paths thus calculated, the control part controls the current value of the electric current in a number larger than the number of the resistors and controls a rotation speed level of the blower to one of rotation speed levels larger in number than the resistors.

In the blower register, the control part may calculate the number of cases of current flow paths with respect to n resistors using an equation, $B=(2^n)-1$, where B is the number of cases of current flow paths with respect to the resistors connected in series, and n is the number of resistors connected in series, the control part may calculate the number of cases of total current flow paths with respect to all the resistors by arithmetically processing the number of cases of current flow paths with respect to n resistors and r resistors directly connected to the blower using an equation, $A=\{(2^n)-1\}+r$, where A is the number of cases of total current flow paths with respect to all the resistors, n is the number of resistors connected in series, and r is the number of resistors directly connected to the blower, and the control part may control the current value of the electric current in a number larger than the number of the resistors based on the number of cases of total current flow paths thus calculated.

According to the blower register of the present invention, the electric current applied to the blower is variably controlled by controlling the current flow paths through a plurality of resistors using bypass switches and a microcomputer. This makes it possible to increase the number of rotation speed levels of the blower.

In particular, it is possible to increase the number of rotation speed levels of the blower without installing additional fixed terminals and resistors and without providing expensive transistors.

Since the number of rotation speed levels of the blower can be increased without installing additional fixed terminals and resistors and without providing expensive transistors, it is possible to increase the number of rotation speed levels of the blower without making many structural changes or increasing costs.

In addition, since the number of rotation speed levels of the blower can be increased without making many structural changes or increasing costs, it is possible to increase the number of rotation speed levels of the blower with little burden of cost and to expect a cost saving effect.

DETAILED DESCRIPTION

Preferred embodiments of a blower register according to the present invention will now be described in detail with reference to the accompanying drawings. Components similar to those of the related art described earlier will be designated by like reference numerals.

Prior to describing features of a blower register according to the present invention, the blower register will be briefly described with reference to FIG. 3.

The blower register includes a movable terminal 20, first to fourth fixed terminals 30a, 30b, 30c and 30d selectively connected to the movable terminal 20, and first to fourth resistors 40a, 40b, 40c and 40d respectively provided on the downstream side of the first to fourth fixed terminals 30a, 30b, 30c and 30d.

The first to fourth fixed terminals 30a, 30b, 30c and 30d are selectively connected n to the movable terminal 20. One of the first to fourth fixed terminals 30a, 30b, 30c and 30d thus connected apply a current of a battery 50 to the corresponding resistors 40a, 40b, 40c and 40d on the downstream side thereof.

In this regard, the movable terminal 20 is an electronic or mechanical switch. The movable terminal 20 is operated in response to a control signal or a user's operation and is selectively connected to any one of the first to fourth fixed terminals 30a, 30b, 30c and 30d.

The first to fourth resistors 40a, 40b, 40c and 40d have different resistance values. The first to third resistors 40a, 40b and 40c are connected in series to the blower 1. The fourth resistor 40d is directly connected to the blower 1.

The first to third resistors 40a, 40b and 40c are arranged on the downstream side of the first to third fixed terminals 30a, 30b and 30c, and are connected in series to the blower 1 in the order of the resistance values.

When the movable terminal 20 is connected to any one of the first to third fixed terminals 30a, 30b an 30c, the first to third resistors 40a, 40b and 40c existing on the downstream side of the connected fixed terminal are connected in series to the blower 1.

Accordingly, when the movable terminal 20 is connected to any one of the first to third fixed terminals 30a, 30b and 30c in order to adjust the rotation speed level of the blower 1, the electric current of the battery 50 sequentially passes through the resistors 40a, 40b and 40c existing on the downstream side of the connected fixed terminal so that the current value is adjusted. The rotation speed level of the blower 1 is adjusted by the electric current whose current value is adjusted.

The number of the resistors 40a, 40b and 40c connected in series increases as one of the fixed terminals 30a, 30b and 30c connected to the movable terminal 20 has a higher numerical order. The number of the resistors 40a, 40b and 40c connected in series decreases as one of the fixed terminals 30a, 30b and 30c connected to the movable terminal 20 has a lower numerical order.

Accordingly, as one of the fixed terminals 30a, 30b and 30c connected to the movable terminal 20 has a higher numerical order, the number of the resistors 40a, 40b and 40c through which the electric current supplied from the battery 50 passes increases so that the current value decreases. As one of the fixed terminals 30a, 30b and 30c connected to the movable terminal 20 has a lower numerical order, the number of the resistors 40a, 40b and 40c through which the electric current supplied from the battery 50 passes decreases so that the current value increases.

As a result, when the fixed terminal 30a on the side of the lower rotation speed level of the blower 1 is connected to the movable terminal 20, the current value applied to the blower 1 becomes small to reduce the rotation speed level of the blower 1. When the field terminal 30c on the side of the higher rotation speed level of the blower 1 is connected to the movable terminal 20, the current value applied to the blower 1 becomes large to increase the rotation speed level of the blower 1.

The fourth resistor 40d has a smaller resistance value than the first to third resistors 40a, 40b and 40c. Thus, when the movable terminal 20 is connected to the fourth fixed terminal 30d in order to control the rotation speed level of the blower 1 to the fourth level, the resistor 40d corresponding to the connected fourth fixed terminal 30d applies an electric current having a larger current value than the first to third resistors 40a, 40b and 40c to the blower 1, whereby the blower 1 rotates at the highest rotation speed level.

In the present embodiment, the wire for connecting the fourth fixed terminal 30d and the blower motor 7 is denoted as the fourth resistor 40d. However, if it is assumed that the wire has no resistance, no resistor may exist between the fourth fixed terminal 30d and the blower motor 7.

In the present embodiment, the battery 50 is connected to the movable terminal 20, and the blower motor 7 is grounded. If necessary, the movable terminal 20 may be grounded, and the battery 50 may be connected to the blower motor 7.

Next, the features of the blower register according to an embodiment of the present invention will be described in detail with reference to FIGS. 3 to 11.

Figure 3:
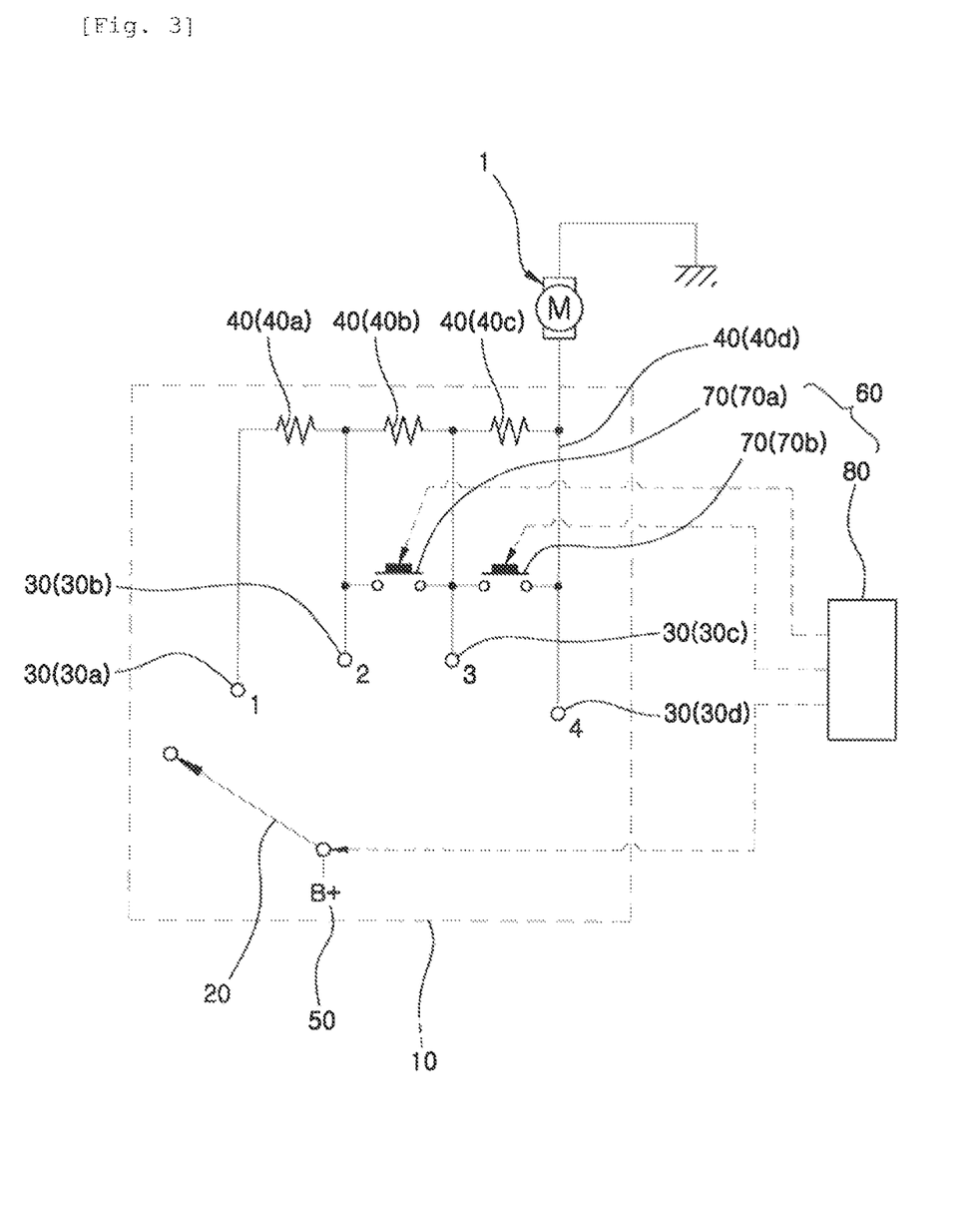
FIG. 3 is a circuit diagram showing major parts of a blower register according to an embodiment of the present invention.

Referring first to FIG. 3, the blower register of the present invention includes a current flow control part 60 configured to control a current flow path through the first to fourth resistors 40a, 40b, 40c and 40d and to subdivide the current values applied to the blower 1 into a number larger than the number of the fixed terminals 30 so that the blower 1 has an increased number of rotation speed levels.

The current flow control part 60 includes one or more bypass switches 70 configured to, when an electric current is applied from the battery 50 to one of the first to fourth fixed terminals 30a, 30b, 30c and 30d, bypass one or more of the resistors 40a, 40b and 40c existing on the downstream side of the current-applied fixed terminal to adjust the number of the resistors 40a, 40b, 40c and 40d through which the electric current passes.

Each of the bypass switches 70 is an electronic or mechanical switch and is installed between the upstream side of one of the resistors 40a, 40b, 40c and 40d and the upstream side of the other of the resistors 40a, 40b, 40c and 40d so as to control the electrical connection between the upstream side of one of the resistors and the upstream side of the other of the resistors.

By controlling the electrical connection between the upstream side of one of the resistors and the upstream side of the other of the resistors, each of the bypass switches 70 allows the electric current of the battery 50 to flow toward the other of the resistors by bypassing one of the resistors.

Specifically, when the movable terminal 20 is connected to any one of the first to fourth fixed terminals 30a, 30b, 30c and 30c so that the electric current of the battery 50 is applied to a specific fixed terminal to control the rotation speed level of the blower 1, each of the bypass switches 70 allows the electric current to bypass one or more of the resistors 40a, 40b, 40c and 40d existing on the downstream side of the connected fixed terminal.

Thus, the number of the resistors 40a, 40b, 40c and 40d through which the electric current of the battery 50 passes is changed in conformity with the rotation speed level of the blower 1. As a result, it is possible to subdivide the current values applied to the blower 1 and to finely control the rotation speed level of the blower 1.

Preferably, the bypass switches 70 are installed between the upstream side of the second resistor 40b and the upstream side of the third resistor 40c and between the upstream side of the third resistor 40c and the upstream side of the fourth resistor 40d.

Thus, the electric current of the battery 50 may be supplied to the third resistor 40c by bypassing the second resistor 40b. Alternatively, the electric current of the battery 50 may be supplied to the fourth resistor 40d by bypassing the third resistor 40c. Alternatively, the electric current of the battery 50 may be supplied to the fourth resistor 40d by bypassing the second resistor 40b.

In the following description, the bypass switch 70 installed between the upstream side of the second resistor 40b and the upstream side of the third resistor 40c will be referred to as "first bypass switch 70a", and the bypass switch 70 installed between the upstream side of the third resistor 40c and the upstream side of the fourth resistor 40d will be referred to as "second bypass switch 70b".

Referring again to FIG. 3, the current flow control part 60 further includes a microcomputer 80 configured to control the movable terminal 20, the first bypass switch 70a and the second bypass switch 70b to adjust the rotation speed level of the blower 1.

The microcomputer 80 is used in the case where the movable terminal 20, the first bypass switch 70a and the second bypass switch 70b are electronic switches. The microcomputer 80 is configured to control the position of the movable terminal 20 with respect to the first to fourth fixed terminals 30a, 30b, 30c and 30d and the on/off operations of the first bypass switch 70a and the second bypass switch 70b. As a result, the microcomputer 80 may adjust the rotation speed level of the blower 1 to one of eight rotation speed levels.

Figure 4:
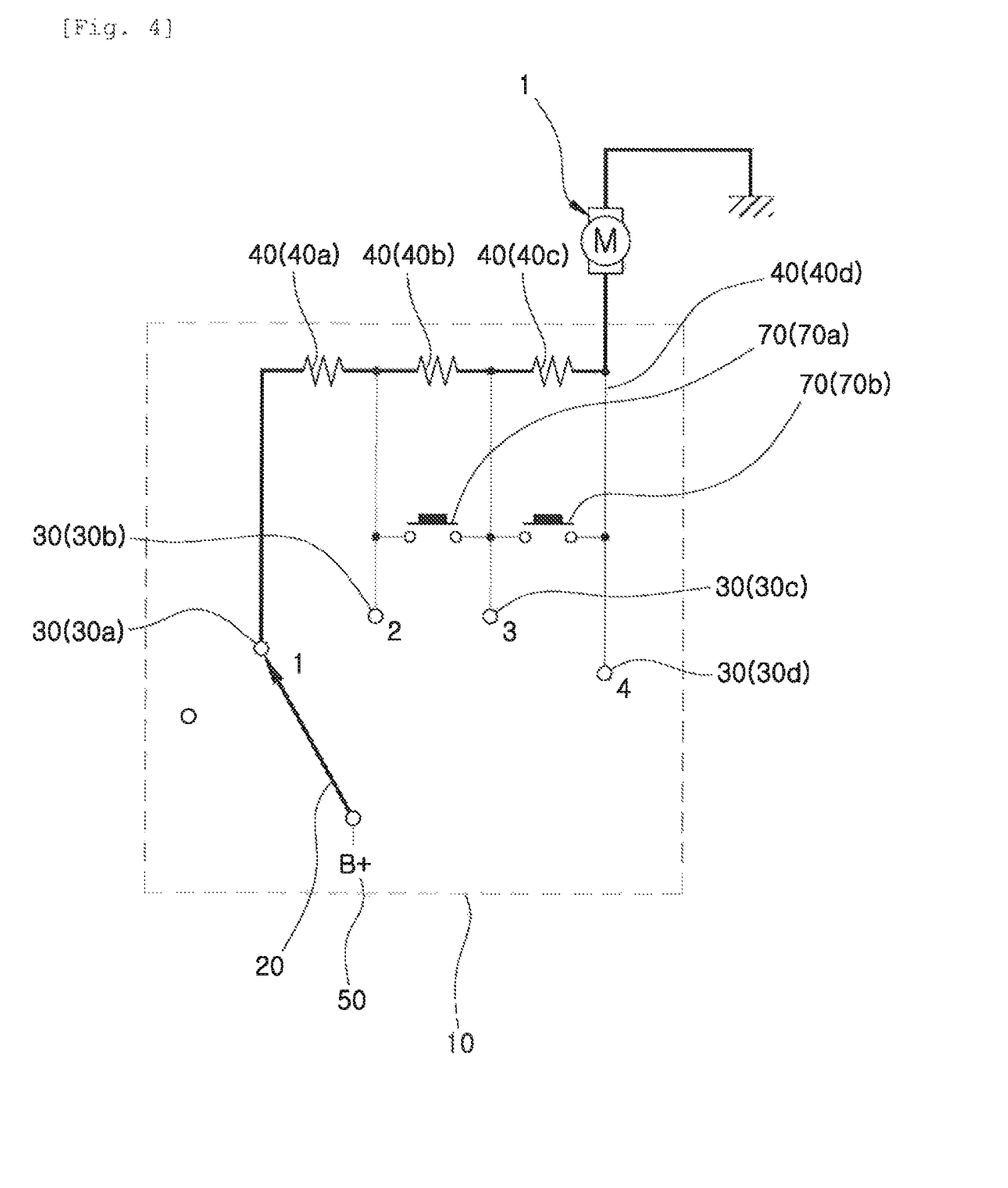
FIGS. 4 to 11 are operation diagrams showing operation examples of the blower register according to the present invention.

More specifically, when the rotation speed level of the blower 1 is set to a first level by the user, the microcomputer 80 connects the movable terminal 20 to the first fixed terminal 30a and turns off the first bypass switch 70a and the second bypass switch 70b as shown in FIG. 4.

Thus, there is formed a current flow path in which the first to third resistors 40a, 40b and 40c existing on the downstream side of the first fixed terminal 30a are connected in series to each other. As a result, the electric current of the battery 50 supplied to the first fixed terminal 30a passes through the first to third resistors 40a, 40b and 40c.

Consequently, the current value becomes smallest as the electric current passes through the three resistors 40a, 40b and 40c having high resistance values. The electric current having the smallest current value is applied to the blower 1, whereby the rotation speed level of the blower 1 is controlled to the first level.

Figure 5:
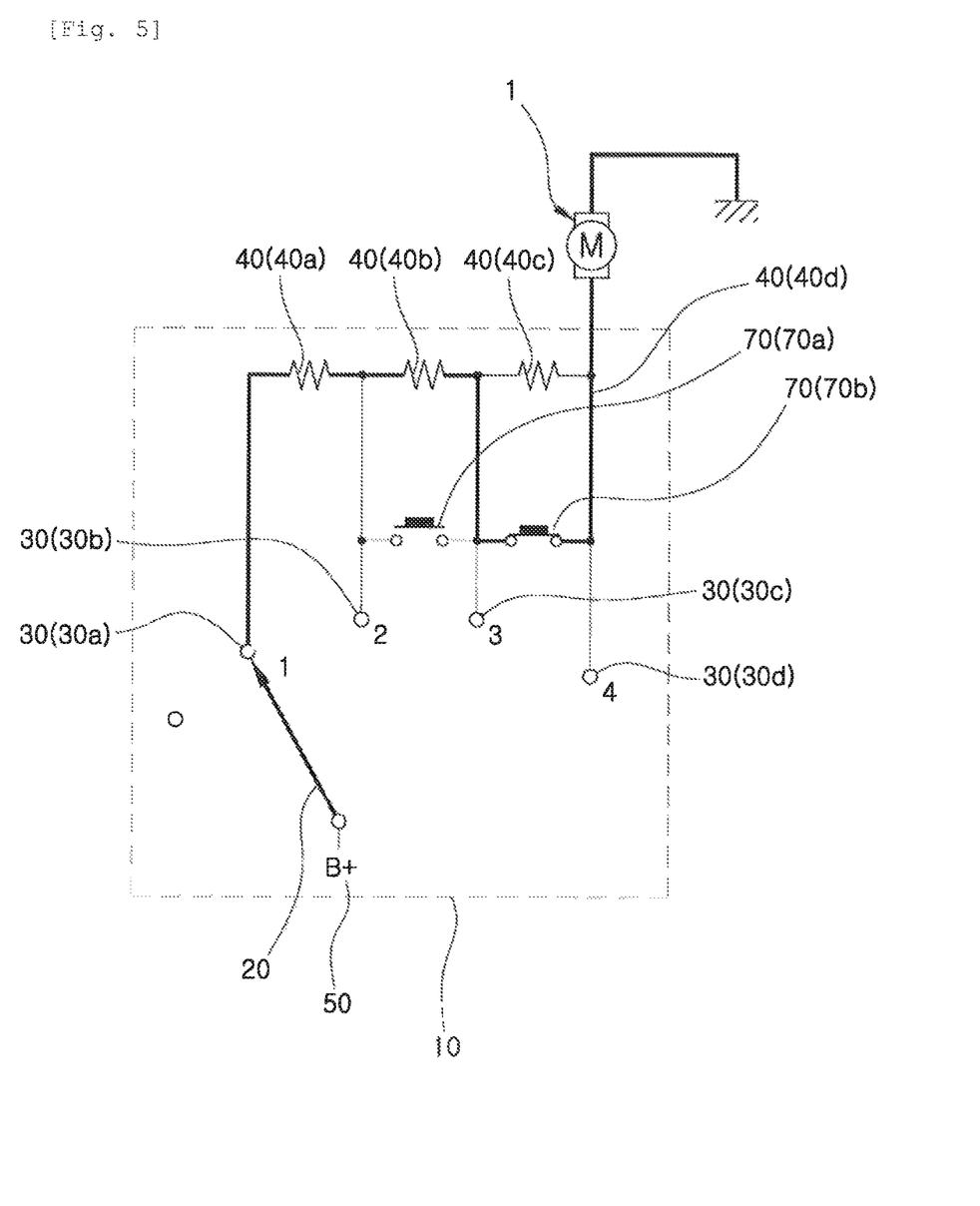

When the rotation speed level of the blower 1 is set to a second level by the user, the microcomputer 80 connects the movable terminal 20 to the first fixed terminal 30a, turns off the first bypass switch 70a and turns on the second bypass switch 70b as shown in FIG. 5.

Thus, there is formed a current flow path in which the second resistor 40b existing on the downstream side of the first fixed terminal 30a is connected in series to the fourth resistor 40d. As a result, the electric current of the battery 50 supplied to the first fixed terminal 30a passes through the first resistor 40a and the second resistor 40b and then flows toward the fourth resistor 40d having a smallest resistance value by bypassing the third resistor 40c.

Consequently, the electric current supplied to the first fixed terminal 30a has a larger current value than that flowing through the current flow path shown in FIG. 4 as the electric current passes through the two resistors 40a and 40b having high resistance values and the resistor 40d having a smallest resistance value. The electric current having such a current value is applied to the blower 1, whereby the rotation speed level of the blower 1 is controlled to the second level.

Figure 6:
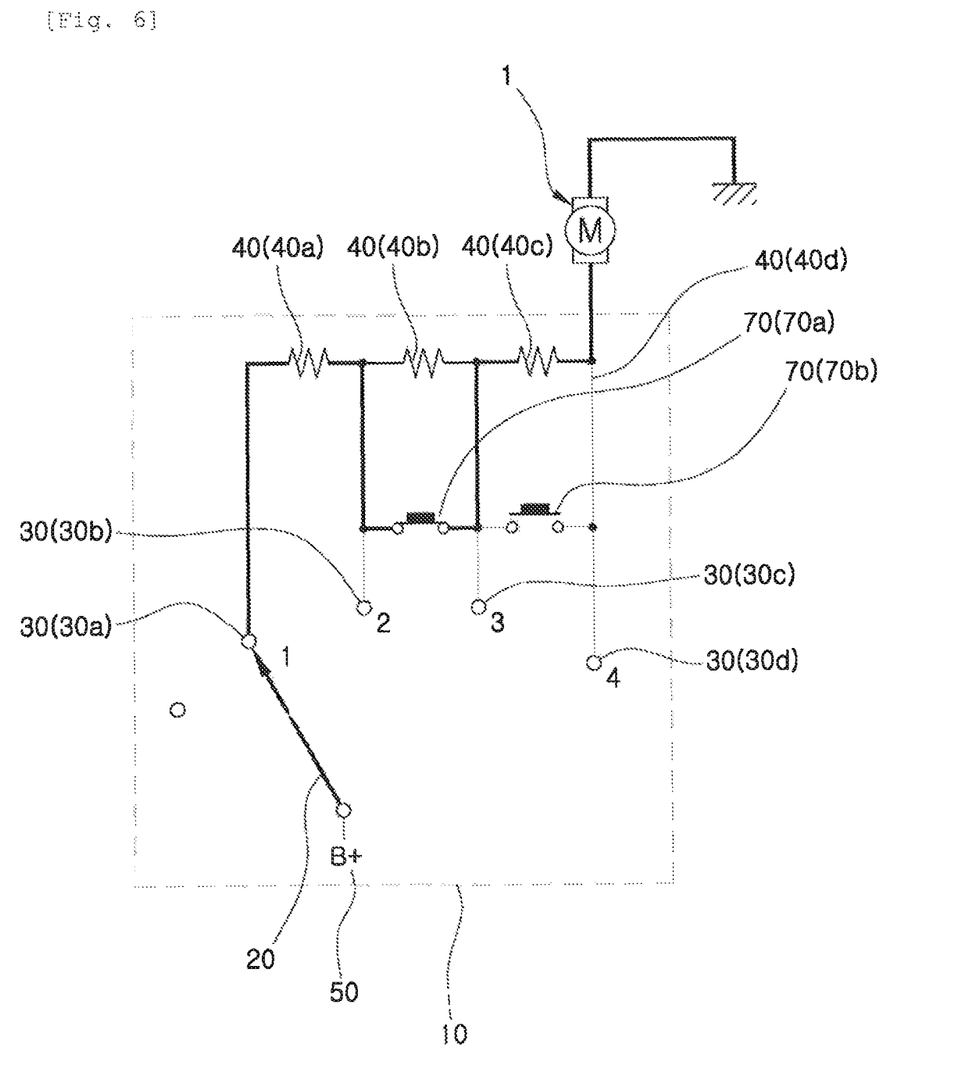

When the rotation speed level of the blower 1 is set to a third level by the user, the microcomputer 80 connects the movable terminal 20 to the first fixed terminal 30a, turns on the first bypass switch 70a and turns off the second bypass switch 70b as shown in FIG. 6.

Thus, there is formed a current flow path in which the first resistor 40a existing on the downstream side of the first fixed terminal 30a is connected in series to the third resistor 40c. As a result, the electric current of the battery 50 supplied to the first fixed terminal 30a passes through the first resistor 40a and then flows toward the third resistor 40c by bypassing the second resistor 40b.

Consequently, the electric current supplied to the first fixed terminal 30a has a larger current value than that flowing through the current flow path shown in FIG. 5 as the electric current passes through the two resistors 40a and 40c having high resistance values and the resistor 40d having a smallest resistance value. The electric current having such a current value is applied to the blower 1, whereby the rotation speed level of the blower 1 is controlled to the third level.

Figure 7:
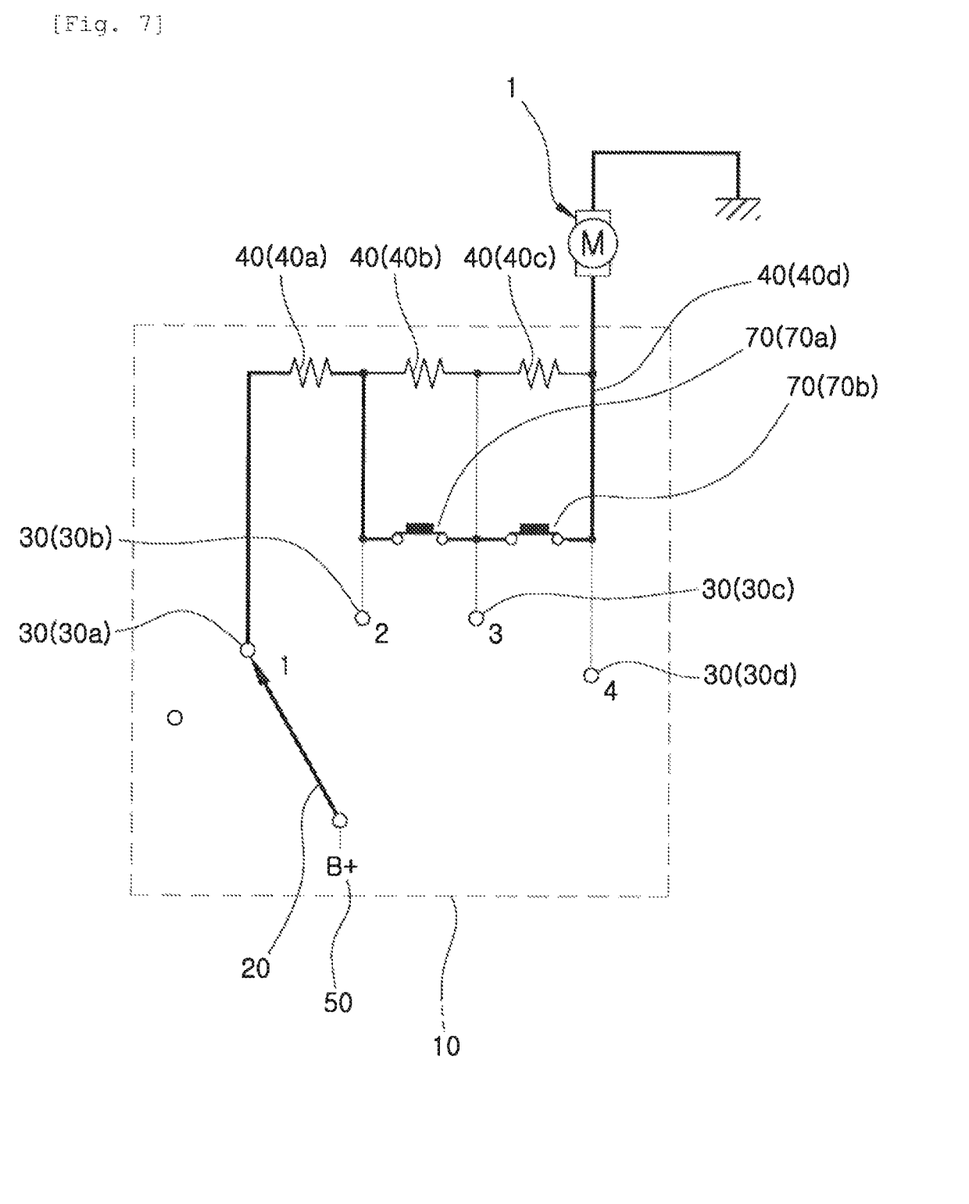

When the rotation speed level of the blower 1 is set to a fourth level by the user, the microcomputer 80 connects the movable terminal 20 to the first fixed terminal 30a, turns on the first bypass switch 70a and turns on the second bypass switch 70b as shown in FIG. 7.

Thus, there is formed a current flow path in which the first resistor 40a existing on the downstream side of the first fixed terminal 30a is connected in series to the fourth resistor 40d. As a result, the electric current of the battery 50 supplied to the first fixed terminal 30a passes through the first resistor 40a and then flows toward the fourth resistor 40d by bypassing the second resistor 40b and the third resistor 40c.

Consequently, the electric current supplied to the first fixed terminal 30a has a larger current value than that flowing through the current flow path shown in FIG. 6 as the electric current passes through the resistor 40a having a largest resistance value and the resistor 40d having a smallest resistance value. The electric current having such a current value is applied to the blower 1, whereby the rotation speed level of the blower 1 is controlled to the fourth level.

Figure 8:
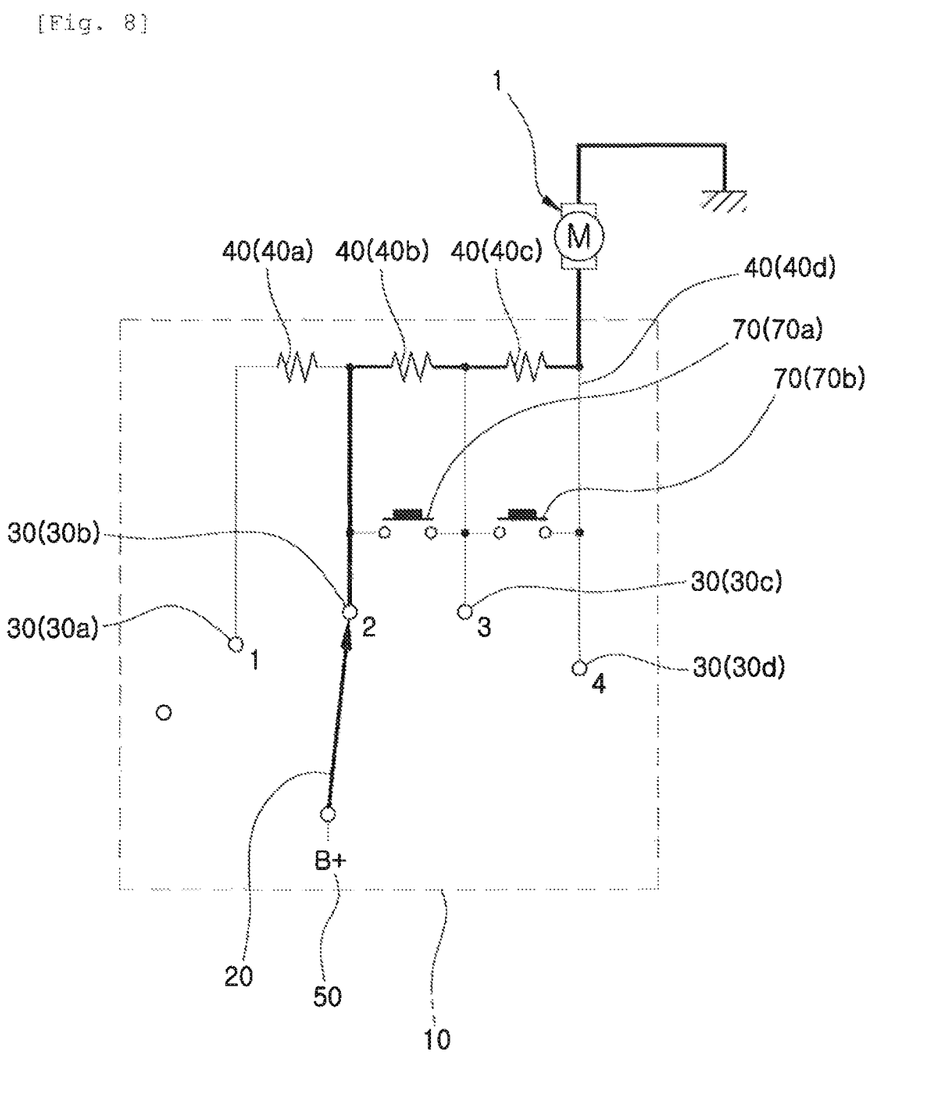

When the rotation speed level of the blower 1 is set to a fifth level by the user, the microcomputer 80 connects the movable terminal 20 to the second fixed terminal 30b, turns off the first bypass switch 70a and turns off the second bypass switch 70b as shown in FIG. 8.

Thus, there is formed a current flow path in which the second and third resistors 40b and 40c existing on the downstream side of the second fixed terminal 30b are connected in series to each other. As a result, the electric current of the battery 50 supplied to the second fixed terminal 30b passes through the second and third resistors 40b and 40c.

Consequently, the electric current supplied to the second fixed terminal 30b has a larger current value than that flowing through the current flow path shown in FIG. 7 as the electric current passes through the two resistors 40b and 40c having high an intermediate resistance value. The electric current having such a current value is applied to the blower 1, whereby the rotation speed level of the blower 1 is controlled to the fifth level.

Figure 9:
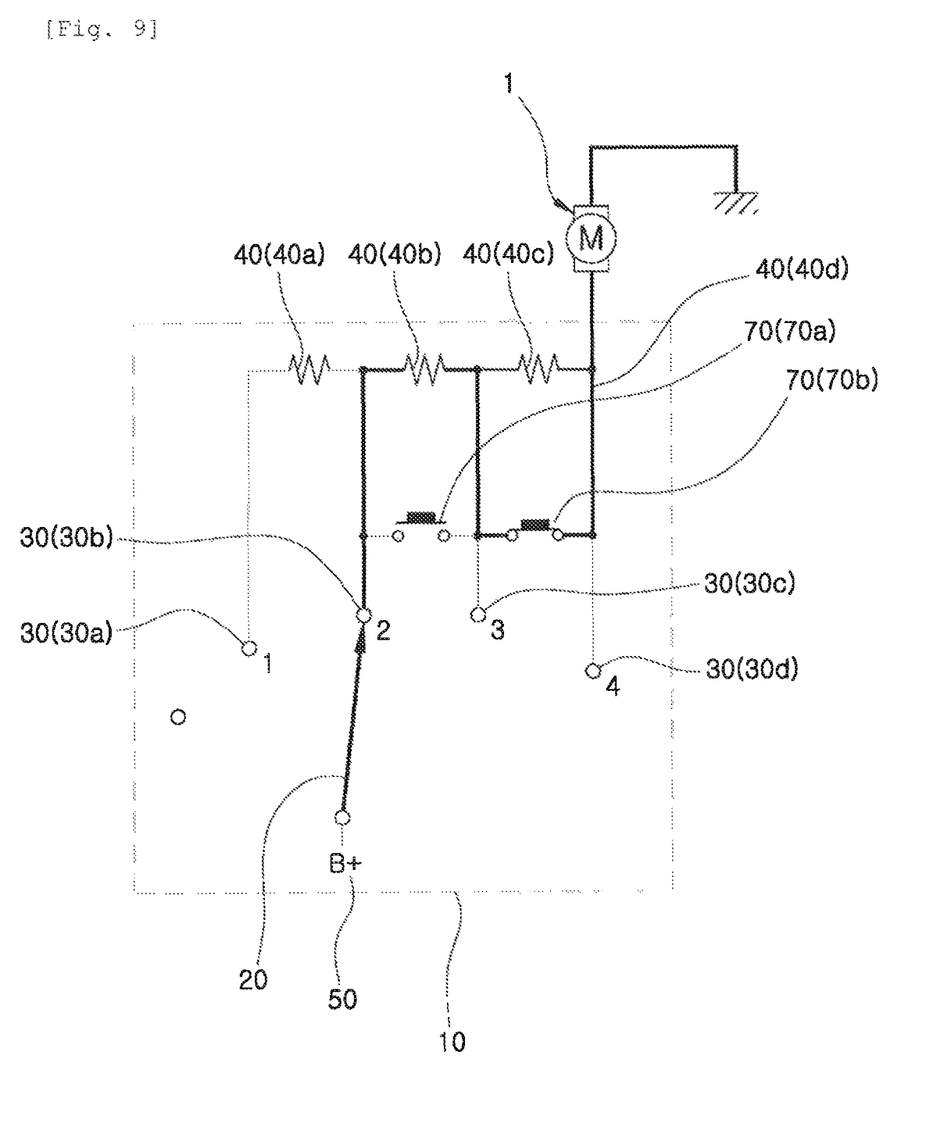

When the rotation speed level of the blower 1 is set to a sixth level by the user, the microcomputer 80 connects the movable terminal 20 to the second fixed terminal 30b, turns off the first bypass switch 70a and turns on the second bypass switch 70b as shown in FIG. 9.

Thus, there is formed a current flow path in which the second resistor 40b existing on the downstream side of the second fixed terminal 30b is connected in series to the fourth resistor 40d. As a result, the electric current of the battery 50 supplied to the second fixed terminal 30b passes through the second resistor 40b and then flows toward the fourth resistor 40d having a smallest resistance value by bypassing the third resistor 40c.

Consequently, the electric current supplied to the second fixed terminal 30b has a larger current value than that flowing through the current flow path shown in FIG. 8 as the electric current passes through the resistor 40b having an intermediate resistance value and the resistor 40a high a smallest resistance value. The electric current having such a current value is applied to the blower 1, whereby the rotation speed level of the blower 1 is controlled to the sixth level.

Figure 10:
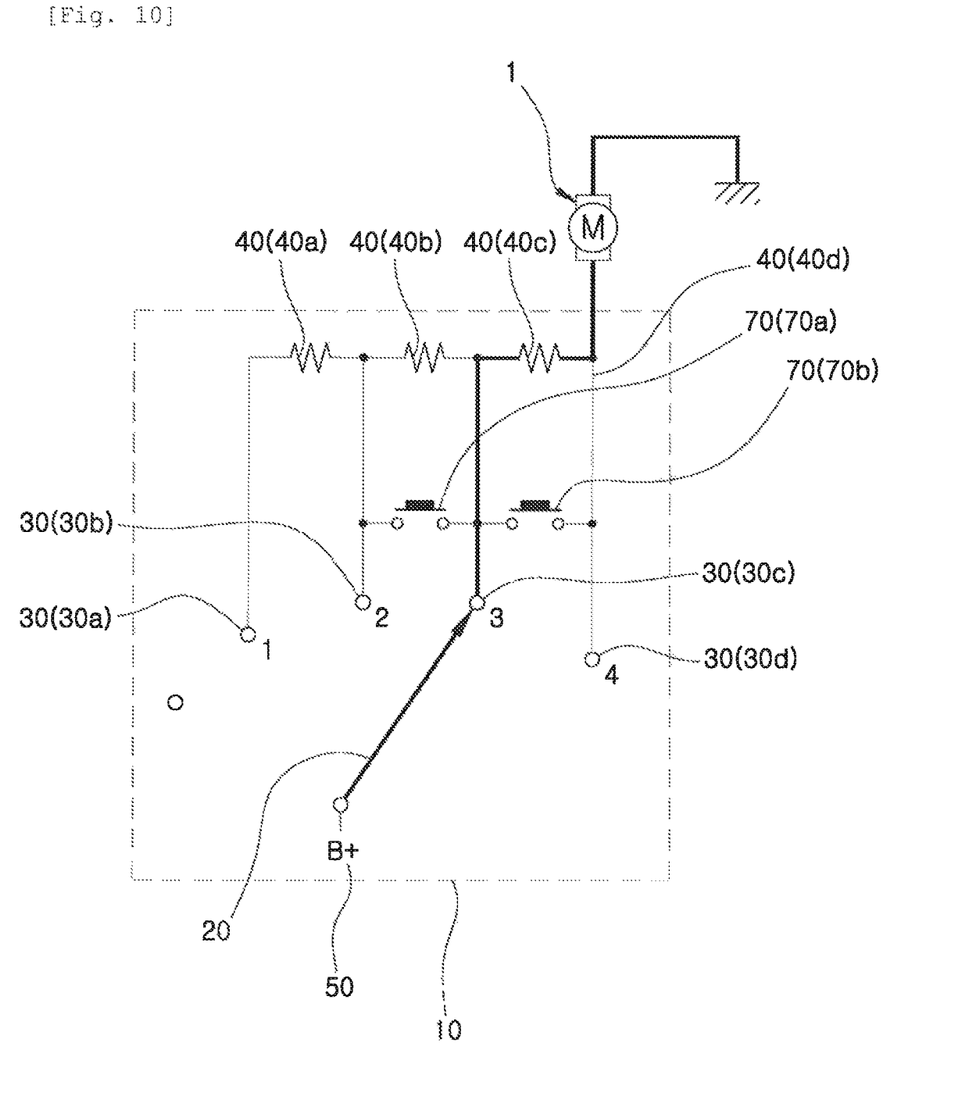

When the rotation speed level of the blower 1 is sec to a seventh level by the user, the microcomputer 80 connects the movable terminal 20 to the third fixed terminal 30c, turns off the first bypass switch 70a and turns off the second bypass switch 70b as shown in FIG. 10.

Thus, there is formed a current flow path in which only the third resistor 40c existing on the downstream side of the third fixed terminal 30c is connected to the blower 1. As a result, the electric current of the battery 50 supplied to the third fixed terminal 30c passes through the third resistor 40c.

Consequently, the electric current supplied to the third fixed terminal 30c has a larger current value than that flowing through the current flow path shown in FIG. 9 as the electric current passes through the resistor 40c having an intermediate resistance value. The electric current having such a current value is applied to the blower 1, whereby the rotation speed level of the blower 1 is controlled to the seventh level.

Figure 11:
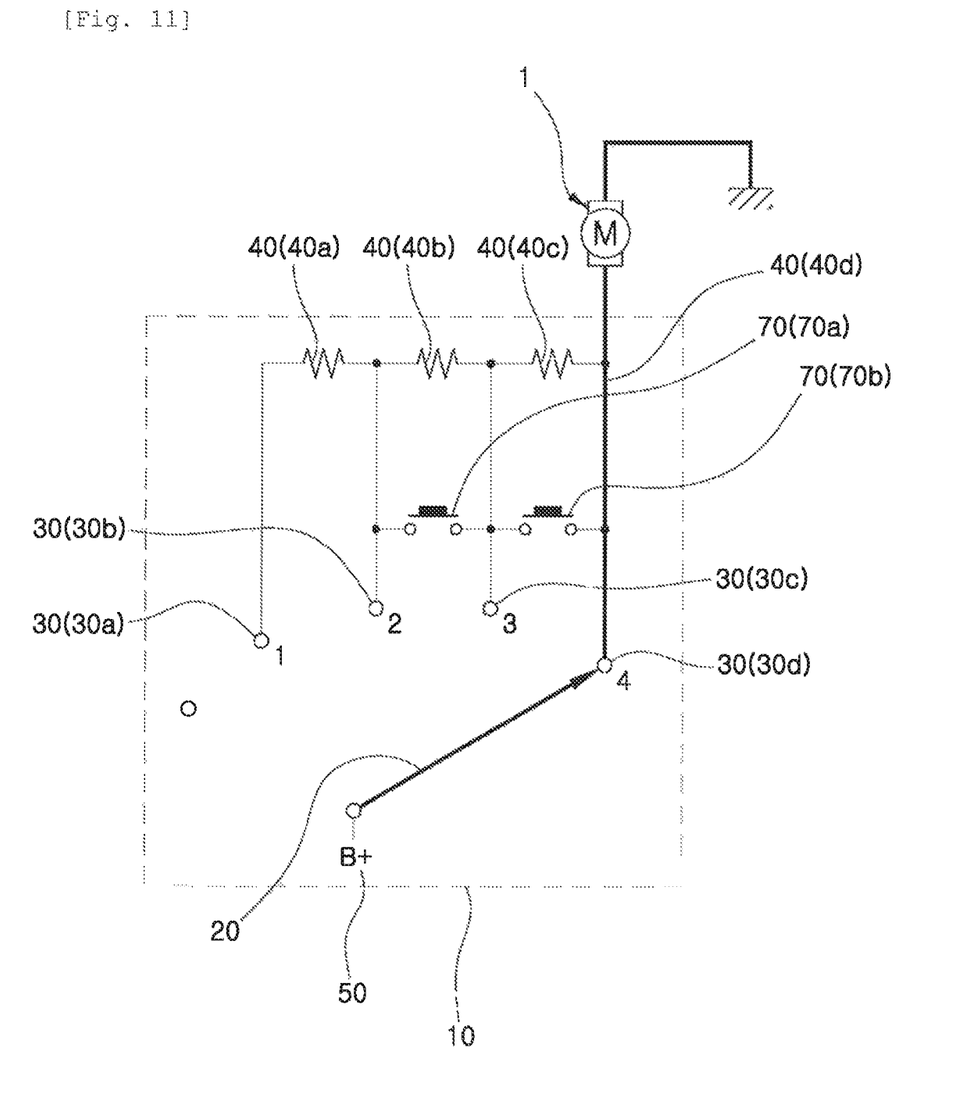

When the rotation speed level of the blower 1 is set to an eighth level by the user, the microcomputer 80 connects the movable terminal 20 to the fourth fixed terminal 30d, turns off the first bypass switch 70a and turns off the second bypass switch 70b as shown in FIG. 11.

Thus, there is formed a current flow path in which only the fourth resistor 40d existing on the downstream side of the fourth fixed terminal 30d is connected to the blower 1. As a result, the electric current of the battery 50 supplied to the fourth fixed terminal 30d passes through the fourth resistor 40a.

Consequently, the electric current supplied to the fourth fixed terminal 30d has a larger current value than that flowing through the current flow path shown in FIG. 10 as the electric current passes through the resistor 40d having a smallest resistance value. The electric current having such a current value is applied to the blower 1, whereby the rotation speed level of the blower 1 is controlled to the eighth level.

According to the blower register of the present invention having such a configuration, the current flow path through the first to fourth resistors 40a, 40b, 40c and 40d is controlled by the bypass switches 70 and the microcomputer 80. This makes it possible to subdivide the current values of the electric current applied to the blower 1, thereby increasing the number of the rotation speed levels of the blower 1.

In particular, it is possible to increase the number of rotation speed levels of the blower 1 without installing additional fixed terminals 30 and resistors 40 and without providing expensive transistors.

Since the number of rotation speed levels of the blower 1 can be increased without installing additional fixed terminals 30 and resistors 40 and without providing expensive transistors, it is possible to increase the number of rotation speed levels of the blower 1 without making many structural changes or increasing costs.

In addition, since the number of rotation speed levels of the blower 1 can be increased without making many structural changes or increasing costs, it is possible to increase the number of rotation speed levels of the blower 1 with little burden of cost and to expect a cost saving effect.

In the embodiment shown in FIGS. 3 to 11, the second bypass switch 70b is installed between the upstream side of the third resistor 40c and the upstream side of the fourth resistor 40d. If necessary, the second bypass switch 70b may be installed between the upstream side of the third resistor 40c and the upstream side of the blower 1.

In this case, the second bypass switch 70b may be configured to allow the electric current of the battery 50 supplied to the third resistor 40c to flow toward the blower 1. Alternatively, the second bypass switch 70b may be configured to allow the electric current of the battery 50 supplied to the upstream side of the second resistor 40b through the first bypass switch 70a to flow directly to the blower 1.

In the present embodiment, the rotation speed level of the blower 1 is controlled to one of eight levels by controlling the first bypass switch 70a and the second bypass switch 70b. However, the present disclosure is not limited thereto. The number of rotation speed levels of the blower 1 may be may be increased or decreased by variously combining the on/off operations of the first bypass switch 70a and the second bypass switch 70b and variously controlling the current flow path through the first to fourth resistors 40a, 40b, 40c and 40d.

If it is assumed that n is the number of resistors 40a, 40b and 40c connected in series to the blower 1 and r is the number of resistor 40d directly connected to the blower 1, when the on/off operations of the bypass switches 70a and 70b are variously combined, the number of cases B of current flow paths with respect to the n resistors 40a, 40b and 40c connected in series may be obtained by equation 1 represented below.

$$B=(2^n)-1 \quad \text{[Equation 1]}$$

where B is the number of cases of current flow paths with respect to the resistors connected in series, and n is the number of resistors connected in series.

If the number of cases B of current flow paths thus obtained and the number r of current flow paths of the resistor 40d directly connected to the blower 1 are arithmetically processed by equation 2 represented below, the number of cases A of total current flow paths with respect to all the resistors 40a, 40b, 40c and 40d may be obtained.

$$A=\{(2^n)-1\}+r \quad \text{[Equation 2]}$$

where A is the number of cases of total current flow paths with respect to all the resistors, n is the number of resistors connected in series, and r is the number of resistors directly connected to the blower.

Based on the number of cases A of total current flow paths thus obtained, the rotation speed level of the blower 1 may be variably controlled to levels larger than the number of the resistors 40a, 40b, 40c and 40d.

More specifically, if it is assumed that the number of the resistors 40a, 40b and 40c connected in series is three and the number of the resistor 40d directly connected to the blower 1 is one as shown in FIG. 3, when the on/off operations of the bypass switches 70a and 70b are variously combined, the number of cases B of current flow paths with respect to the three resistors 40a, 40b and 40c connected in series may be seven as represented by the following equation 1.

$$B=(2^3)-1=7 \quad \text{[Equation 1]}$$

If the number of cases B of current flow paths thus obtained, i.e., 7, and the number r of current flow paths of the resistor 40d directly connected to the blower 1, i.e., 1, are arithmetically processed by equation 2 represented below, the number of cases A of total current flow paths with respect to all the resistors 40a, 40b, 40c and 40d may be obtained.

$$A=\{(2^3)-1\}+1=8 \quad \text{[Equation 2]}$$

The number of cases A of total current flow paths with respect to all the resistors obtained by equation 2 is 8. Based on the number of cases A, i.e., 8, the rotation speed level of the blower 1 may be variably controlled to one of eight levels at the maximum, which is larger than the number of the resistors 40*a*, 40*b*, 40*c* and 40*d*, i.e., 4.

Consequently, if the on/off operations of the first bypass switch 70*a* and the second bypass switch 70*b* are variously combined, it is possible to variably control the current flow paths with respect to the resistors 40*a*, 40*b*, 40*c* and 40*d*. By variably controlling the current flow paths in this manner, it is possible to adjust the rotation speed level of the blower 1 within the range of the number of cases A of total current flow paths.

Figure 12:
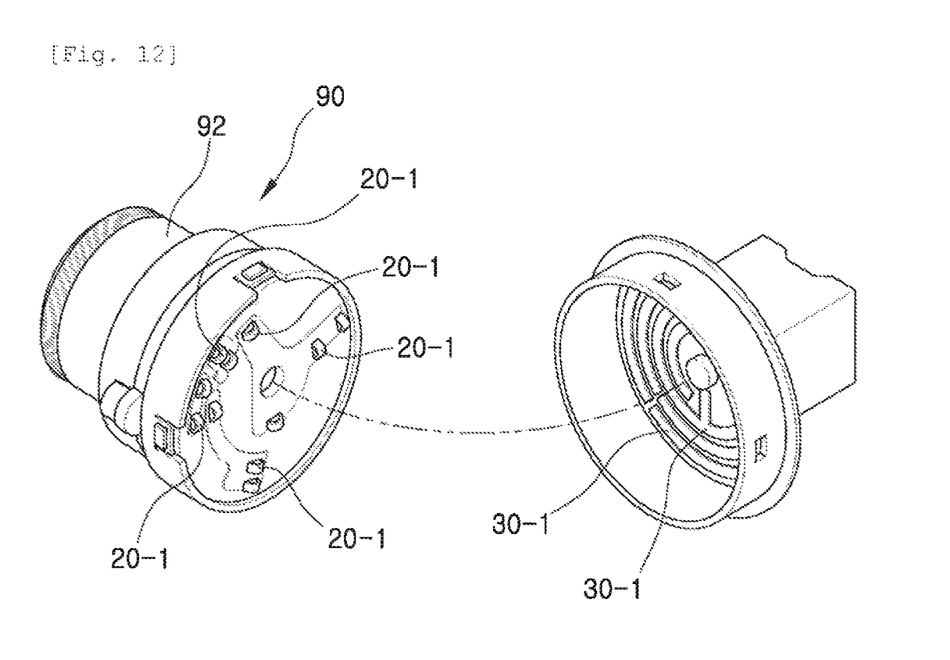
FIG. 12 is a view showing a blower register according to another embodiment of the present disclosure.

FIG. 12 is a view showing a blower register according to another embodiment of the present disclosure.

The blower register according to another embodiment of the present invention is used in the case where the movable terminal 20, the first bypass switch 70*a* and the second bypass switch 70*b* are mechanical switches (see FIG. 3). The blower register includes a mechanical rotary switch 90 including movable terminal brushes 20-1 and fixed terminal tracks 30-1.

The mechanical rotary switch 90 is configured to adjust the rotation speed level of the blower using the mechanical contact between the movable terminal brushes 20-1 and the fixed terminal tracks 30-1.

In the mechanical rotary switch 90, unlike the above-described embodiment in which the rotation speed level of the blower 1 is controlled by the electronic first and second bypass switches 70*a* and 70*b* (see FIG. 3) and the microcomputer 80, the rotation speed level of the blower 1 is controlled to one of eight levels by adjusting the number, length and interval of the movable terminal brushes 20-1 and the fixed terminal tracks 30-1. The first bypass switch 70*a* and the second bypass switch 70*b* are realized by the contact points between the movable terminal brushes 20-1 and the fixed terminal tracks 30-1.

Specifically, the contact point positions of the movable terminal brushes 20-1 with respect to the fixed terminal tracks 30-1 are variably controlled by rotating a rotary knob 92. By virtue of such variable control of the contact point positions, an electric current is allowed to bypass one or more of the resistors 40 existing on the downstream of one of the fixed terminal tracks 30-1, thereby realizing the first bypass switch 70*a* and the second bypass switch 70*b*.

In the blower register having the configuration described above, when the rotary knob 92 is rotated by the user in order to adjust the rotation speed level of the blower 1, the on/off operations of the contact points of the movable terminal brushes 20-1 and the fixed terminal tracks 30-1 are controlled depending on the rotation angle of the rotary knob 92, whereby the rotation speed level of the blower 1 is controlled to one of eight level 3.

In other words, the rotation speed level of the blower 1 is controlled to one of eight levels by the combination of the on/off operations of the contact points of the movable terminal brushes 20-1 and the fixed terminal tracks 30-1.

Specifically, when the rotary knob 92 is rotated by the user to set the first rotation speed level of the blower 1, the movable terminal 20 is connected to the first fixed terminal 30*a*, the first bypass switch 70*a* is turned off, and the second bypass switch 70*b* is turned off as shown in FIG. 4. Thus, the electric current passing through the three resistors 40*a*, 40*b* and 40*c* is applied to the blower 1 to control the blower 1 to the first rotation speed level.

When the rotary knob 92 is rotated by the user to set the second rotation speed level of the blower 1, the movable terminal 20 is connected to the first fixed terminal 30*a*, the first bypass switch 70*a* is turned off, and the second bypass switch 70*b* is turned on as shown in FIG. 5. Thus, the electric current passing through the resistors 40*a* and 40*b* and the resistor 40*d* having a smallest resistance value is applied to the blower 1 to control the blower 1 to the second rotation speed level.

When the rotary knob 92 is rotated by the user to set the third rotation speed level of the blower 1, the movable terminal 20 is connected to the first fixed terminal 30*a*, the first bypass switch 70*a* is turned on, and the second bypass switch 70*b* is turned off as shown in FIG. 6. Thus, the electric current passing through the resistors 40*a* and 40*c* is applied to the blower 1 to control the blower 1 to the third rotation speed level.

When the rotary knob 92 is rotated by the user to set the fourth rotation speed level of the blower 1, the movable terminal 20 is connected to the first fixed terminal 30*a*, the first bypass switch 70*a* is turned on, and the second bypass switch 70*b* is turned on as shown in FIG. 7. Thus, the electric current passing through the resistor 40*a* and the resistor 40*d* having a smallest resistance value is applied to the blower 1 to control the blower 1 to the fourth rotation speed level.

When the rotary knob 92 is rotated by the user to set the fifth rotation speed level of the blower 1, the movable terminal 20 is connected to the second fixed terminal 30*b*, the first bypass switch 70*a* is turned off, and the second bypass switch 70*b* is turned off as shown in FIG. 8. Thus, the electric current passing through the resistor 40*b* and the resistor 40*c* is applied to the blower 1 to control the blower 1 to the fifth rotation speed level.

When the rotary knob 92 is rotated by the user to set the sixth rotation speed level of the blower 1, the movable terminal 20 is connected to the second fixed terminal 30*b*, the first bypass switch 70*a* is turned off, and the second bypass switch 70*b* is turned on as shown in FIG. 9. Thus, the electric current passing through the resistor 40*b* and the resistor 40*d* having a smallest resistance value is applied to the blower 1 to control the blower 1 to the sixth rotation speed level.

When the rotary knob 92 is rotated by the user to set the seventh rotation speed level of the blower 1, the movable terminal 20 is connected to the third fixed terminal 30*c*, the first bypass switch 70*a* is turned off, and the second bypass switch 70*b* is turned off as shown in FIG. 10. Thus, the electric current passing through the resistor 40*c* is applied to the blower 1 to control the blower 1 to the seventh rotation speed level.

When the rotary knob 92 is rotated by the user to set the eighth rotation speed level of the blower 1, the movable terminal 20 is connected to the fourth fixed terminal 30*d*, the first bypass switch 70*a* is turned off, and the second bypass switch 70*b* is turned off as shown in FIG. 11. Thus, the electric current passing through the resistor 40*d* having a smallest resistance value is applied to the blower 1 to control the blower 1 to the eighth rotation speed level.

The blower register according to another embodiment of the present invention is configured to subdivide the rotation speed level of the blower 1 using the contact points of the mechanical switches. Therefore, unlike the above-described embodiment in which the rotation speed level of the blower 1 is controlled using the electronic first and second bypass switches 70*a* and 70*b* and the microcomputer 80, it is possible to suppress the use of expensive components.

Accordingly, it is possible to expect a cost saving effect. The blower register according to another embodiment of the present invention can be installed in a low-priced motor vehicle with little burden of cost.

While some preferred embodiments of the present invention have been described above, the present invention is not limited to the above-described embodiments. Various modifications and changes may be made without departing from the scope and spirit of the present invention defined in the claims.

What is claimed is:

1. A blower register, comprising:
a movable terminal;
a plurality of fixed terminals to which the movable terminal is selectively connected;
a plurality of resistors installed on the downstream side of the fixed terminals to adjust a current value of an electric current applied to a blower; and
a current flow control part configured to subdivide the current value of the electric current in a number larger than the number of the fixed terminals and to form current flow paths through the resistors so that a rotation speed level of the blower is controlled to one of rotation speed levels larger in number than the fixed terminals;
wherein two or more of the resistors are connected in series to the blower so as to adjust the current value of the electric current applied to the blower while allowing the electric current supplied to one of the fixed terminals to sequentially pass through the resistors, and
the current flow control part is configured to, when the electric current is supplied to one of the fixed terminals, control a flow of the electric current so that the electric current bypasses one or more of the resistors existing on the downstream side of one of the fixed terminals to which the electric current is supplied, whereby the current flow control part variably controls the number of the resistors through which the electric current passes, and subdivides the current value of the electric current applied to the blower.

2. The blower register of claim 1, wherein one of the fixed terminals is directly connected to the blower, and
the current flow control part includes one or more bypass switches configured to control a flow of the electric current so that the electric current bypasses one or more of the resistors existing on the downstream side of one of the fixed terminals to which the electric current is supplied, and configured to variably control the number of the resistors through which the electric current passes.

3. The blower register of claim 2, wherein each of the bypass switches is installed between the upstream side of one of the resistors and the upstream side of the other of the resistors and configured to electrically connect or disconnect one of the resistors and the other of the resistors so that the electric current flows toward the other of the resistors by bypassing one of the resistors.

4. The blower register of claim 3, wherein the fixed terminals includes first to fourth fixed terminals,
the resistors includes first to third resistors corresponding to the first to third fixed terminals, the first to third resistors connected in series to the blower so as to allow the electric current supplied to one of the fixed terminals to sequentially pass through the first to third resistors, the fourth fixed terminal configured to directly apply the electric current to the blower,
the bypass switches include a first bypass switch installed between the upstream side of the second resistor and the upstream side of the third resistor, and a second bypass switch installed between the upstream side of the third resistor and the blower,
the first bypass switch is configured to allow the electric current supplied from a battery to the second resistor to flow toward the third resistor by bypassing the second resistor,
the second bypass switch is configured to allow the electric current supplied from the battery to the third resistor to flow toward the blower by bypassing the third resistor, and
the first bypass switch and the second bypass switch are configured to allow the electric current supplied from the battery to the second resistor to flow toward the blower by bypassing the second resistor and the third resistor.

5. The blower register of claim 4, wherein the position of the movable terminal with respect to the first to fourth fixed terminals and the on/off operations of the first bypass switch and the second bypass switch are controlled to variably control the current flow paths through the first to third resistors and to adjust the rotation speed level of the blower.

6. The blower register of claim 5, wherein when the rotation speed level of the blower is set to one of a plurality of rotation speed levels, the movable terminal is connected to one of the first to fourth fixed terminals and the first bypass switch and the second bypass switch are turned on or off so as to form one of the current flow paths through the resistors and to control the rotation speed level of the blower to one of the rotation speed levels.

7. The blower register of claim 3, wherein the current flow control part includes a plurality of movable terminal brushes arranged on the side of the movable terminal, a plurality of fixed terminal tracks arranged on the side of the fixed terminals, and a mechanical rotary switch including one or more bypass switches configured to control contact point positions of the movable terminal brushes with respect to the fixed terminal tracks so that the electric current bypasses one or more of the resistors existing on the downstream side of one of the fixed terminal tracks, and
the mechanical rotary switch is configured to control the positions of the movable terminal brushes with respect to the fixed terminal tracks and the on/off operations of the bypass switches depending on a rotation angle thereof so that the current flow paths through the resistors are controlled to adjust the rotation speed level of the blower.

8. The blower register of claim 3, wherein the movable terminal and the bypass switches are configured to be electronically operated in response to control signals applied thereto, and
the current flow control part includes a microcomputer configured to control the position of the movable terminal with respect to the fixed terminals and the on/off operations of the bypass switches so that the current flow paths through the resistors are controlled to adjust the rotation speed level of the blower.

9. The blower register of claim 1, wherein the resistors have different resistance values.

* * * * *